UNITED STATES PATENT OFFICE.

NOAK VICTOR HYBINETTE, OF CHRISTIANIA, NORWAY.

PROCESS OF EXTRACTING COPPER FROM ORES.

1,122,759.

Specification of Letters Patent.

Patented Dec. 29, 1914.

No Drawing.

Application filed May 22, 1913. Serial No. 769,207.

*To all whom it may concern:*

Be it known that I, NOAK VICTOR HYBINETTE, a subject of the King of Norway, residing at Christiania, Norway, have invented certain new and useful Improvements in Processes of Extracting Copper from Ores; and I do hereby declare the following to be a full, clear, and exact description of the invention, such as will enable others skilled in the art to which it appertains to make and use the same.

This invention has for its object a process of extracting copper from ores.

In the treatment of sulfid copper ores by roasting, leaching and electrolysis it has been proposed to roast so as to obtain mostly $Cu_2S$ and to carry out the electrolysis in cells provided with diaphragms, whereby the iron that always is present is oxidized to the ferric state, and these salts are afterward reduced in the leaching, at the same time as the sulfid of copper is dissolved. This process was found impracticable, and later processes have been based upon roasting to oxid and extracting the copper with acid, plating in cells without diaphragms and providing against the formation of ferric salts by reduction with sulfurous acid.

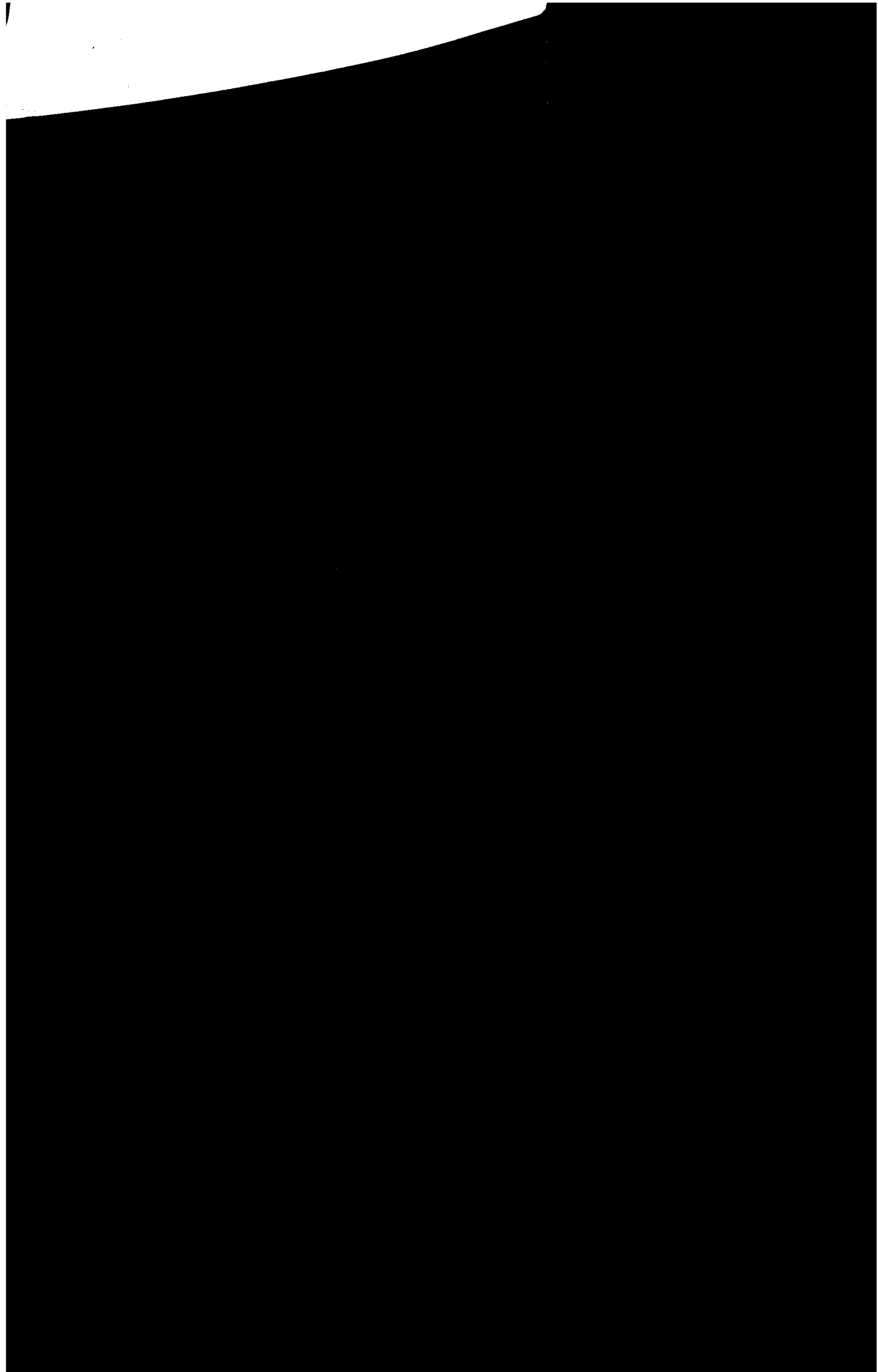

The present process consists in roasting the ore further than in the first named process but not to complete oxidation of the ore. The electrolysis is carried out without diaphragms, and the ferric iron salts formed during the electrolysis are used to dissolve the sulfids, which are left in the ore on account of the incomplete roasting. This would be impossible under ordinary conditions, but I have found a way to conduct the process so as to make it practicable. The disturbing influences of the ferric salts upon the deposition of the copper do not make themselves felt, before the amount is above 10 gr. ferric iron per liter, and the process does not become practically impossible, before the amount rises above 15 gr. per liter. I have also found that the rapidity of the oxidizing of the iron salts depends upon the amount of ferrous iron present in the solution and in such a way, that the oxidation goes on with almost theoretical rapidity as long as there is more than 30 gr. ferrous iron present, but if there is only 15 gr. ferrous iron, there is practically no oxidation to ferric salts and the oxygen goes mostly into the air as such. Therefore as long as the total iron contents of the solution does not rise much above the 30 gr. per liter the oxidation of iron above 15 gr. per liter as ferric sulfate goes very slowly and as stated above the dissolving of the cathodes does not present unsurmountable difficulties at that point of concentration of ferric salts. At the same time I have found that most of the sulfid of copper present in the ore is readily soluble in a solution containing 15 gr. iron as ferric sulfate, but insoluble if the concentration goes below 10 gr. per liter. There is therefore here a small field inside which it is possible to work, a process of leaching and electrolysis without the use of diaphragms, namely by holding the total iron contents of the solution at a concentration of about 30 gr. per liter, and the process may therefore be carried out as follows: The ore is roasted, so that there will be left a certain amount of un-oxidized copper compounds, but the bulk of the copper will be present in the shape of oxid or sulfate. About 25% of the total copper should be present as sulfid compounds and insoluble in 5% sulfuric acid. A solution containing about 30 gr. iron and 20 gr. copper as sulfates and about 60 gr. free sulfuric acid per liter is then provided. This solution is continually circulated between the electrolytic cells and the leaching tanks. The cells are provided with leaden anodes and are operated without diaphragms or any other special provision. The circulation is however regulated in such a way, that the solution enters the cells with about 30 gr. Cu. per liter and leaves them with about 20 gr. The solution contains ferric iron in quantity from 2 to 5 grams per liter upon entering the cells and about 15 gr. upon leaving. I plate out 10 gr. copper and oxidize 10 gr. iron. Theoretically, there would be oxidized double as much iron as there is plated copper, and if I had 40 gr. Fe present instead of 30 gr. there would be 20 gr. Fe oxidized and the plating would be impossible, but on account of the limited amount of iron present, the oxidation stops at 15 gr. ferric iron per liter. The success of the process therefore depends entirely upon the ore being roasted to the correct point not too much and not too little, and that the solution contains the proper amount of iron, namely about 30 gr. per liter. The first condition is fulfilled by regulating the time and temperature of the roasting. The second is regulated by discarding part of the solution from time to